Jan. 6, 1953 R. H. DICKE 2,624,876
OBJECT DETECTION SYSTEM
Filed Sept. 14, 1945
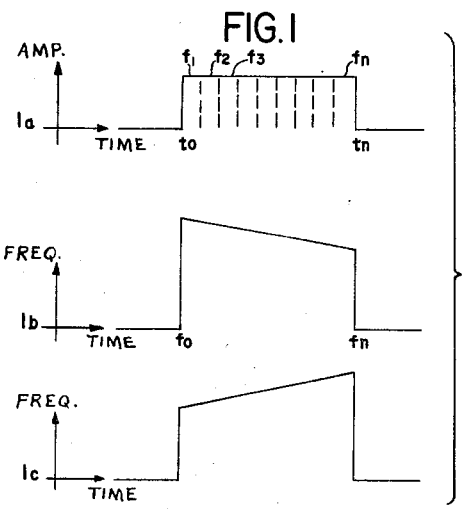
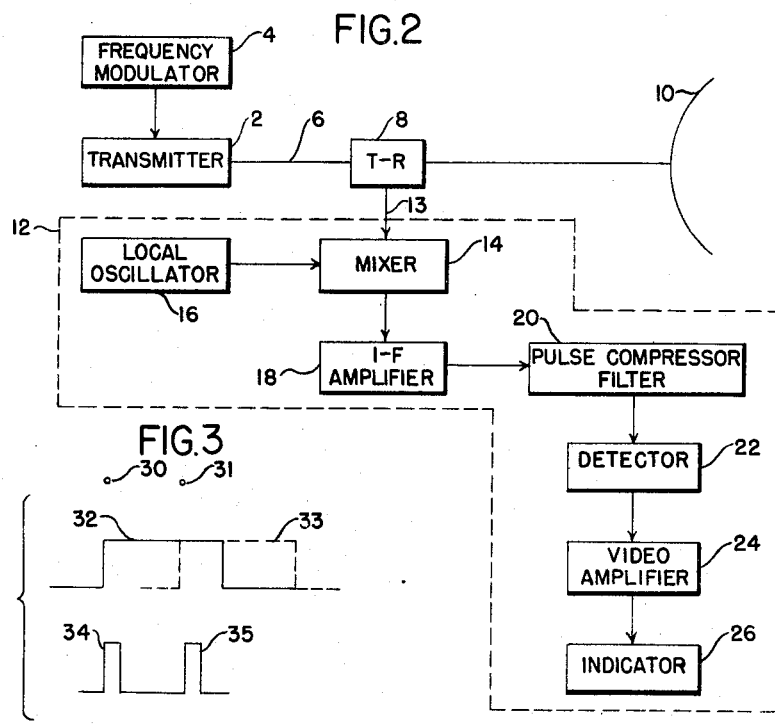
*INVENTOR.*
ROBERT H. DICKE
BY
ATTORNEY Patented Jan. 6, 1953

2,624,876

UNITED STATES PATENT OFFICE 2,624,876

OBJECT DETECTION SYSTEM

Robert H. Dicke, Cambridge, Mass., assignor, by mesne assignments, to the United States of America as represented by the Secretary of War Application September 14, 1945, Serial No. 616,382

10 Claims. (Cl. 343—13)

The present invention relates to a radio object-locating system, and it relates more particularly to one having both relatively high power and good range resolution.

In general a radio object-locating system includes a transmitter providing short duration high carrier frequency exploratory pulses of radiant energy which are radiated into space by means of a directional antenna. These exploratory pulses upon striking an object are returned in the form of echo pulses to the radio object-locating system. An indication of these echo pulses is then provided, such indication usually being visual in form and presented on a cathode ray indicator.

In order to get good range resolution; i. e., to have a large proportion of individual objects appear as individual signals on the cathode ray indicator, it is necessary that pulses manifesting the objects have a relatively short duration. In order to obtain good range resolution by shortening the duration of the exploratory pulses and to still maintain high energy per pulse, it is necessary to increase the amplitude of the pulses. This cannot be readily accomplished by ordinary means, however, as by increasing the amplitude of the pulses (and thereby maintaining high energy per pulse) the voltages become so high that sparking occurs in the magnetron and other components of the transmitter. The antenna itself is one place where sparking often occurs when the amplitude of the pulses is too great.

The present invention provides a means whereby high energy pulses may be transmitted and good range resolution obtained. In general, the way this is accomplished is to transmit relatively low amplitude long duration pulses, thereby obtaining high energy in each pulse without causing sparking in the transmitting components of the system, and to later transform the long duration pulses into relatively short duration high amplitude pulses.

It is therefore an object of the present invention to provide a radio object locating system which transmits relatively long duration low amplitude, high energy pulses and yet has good range resolution.

It is another object of the present invention to provide a pulse compressor whereby pulses having a predeterminable duration, amplitude, and energy may be transformed or compressed into pulses having a duration less than, and an amplitude greater than said pulses having a predeterminable duration and amplitude.

The above and other objects and advantages of the present invention will be more fully understood from the following detailed description when taken into consideration with the accompanying drawing wherein:

Fig. 1 is a representation, in idealized form, of typical transmitted pulses; and Fig. 2 is a schematic diagram in block form of one embodiment of the present invention; and Fig. 3 illustrates one of the principles of the present invention.

It is well known that the velocity of propagation of electrical energy through certain electrical circuits is dependent upon the carrier frequency of that electrical energy. As a result of this and by reference to Fig. 1, the basic concept of a pulse compressor may be readily understood. Before discussing the figure, however, it is to be clearly understood that Fig. 1 is representative only, and is so shown for purposes of clarity and ease of description.

In the accompanying drawing, Fig. 1a represents the envelope of a frequency modulated pulse. Fig. 1b is merely a representative plot of the frequency of the pulse vs. time, in which the carrier frequency of the pulse at $t_0$ is equal to $f_0$ and the carrier frequency of the pulse at $t_n$ is equal to $f_n$.

For the purposes of analogy only, consider the pulse shown in Fig. 1a to consist of a series of contiguous incremental pulses each having its own carrier frequency. The first incremental pulse may be considered as having a frequency $f_1$; the second a frequency $f_2$; the third a frequency $f_3$, etc. until the $n$th incremental pulse has a frequency of $f_n$.

It is known that if electrical energy is passed through a low pass filter network, the velocity of propagation of the electrical energy is a function of the carrier frequency of that electrical energy and in fact, the velocity of propagation is a maximum for low frequencies and decreases as the frequency increases, finally becoming zero at cutoff.

If the entire frequency modulated pulse consisting of $n$ incremental contiguous pulses is then applied to such a low pass filter, each incremental contiguous pulse will have an individual group velocity $v_g$. As the group velocity increases, the carrier frequency decreases, and it can be seen that an incremental pulse having a carrier frequency $f_1$ will move through the low pass filter network more slowly than an incremental pulse having a carrier frequency $f_2$. In a similar manner, the incremental pulse having a carrier frequency $f_3$ will move through the filter network at a greater rate than either of the preceding pulses. In other words, the latter incremental portions of the frequency modulated pulse applied to the filter move through the filter network at a greater rate than the earlier incremental portions of the pulse. The result is that the latter applied incremental pulses overtake the first applied and slower moving incremental pulses and all are bunched or compressed at the output end of the filter. Thus, the output of the filter consists of a pulse of a shorter duration and of a higher amplitude than the original frequency modulated pulse originally fed into the low pass filter network.

A proper termination or load is required for the filter network in order to prevent undesirable reflections from being set up therein.

In the above description taken in consideration with Figs. 1a and 1b, only idealized forms of a pulse were considered and it appeared from Fig. 1b that the frequency modulation characteristic is linear. As explained heretofore, this simplified form was discussed in order to present a simple and clear explanation of the basic principle involved. Actually the modulation may not be linear and the original pulse applied to the filter network may not be truly rectangular as shown.

The shape or waveform of the low amplitude relatively long duration pulse to be applied to the filter may be readily determined in the following manner. A short duration high amplitude pulse of the character desired as an output from the filter may be generated and applied to the low pass filter network. The resulting pulse received at the output will in general have a lower amplitude and a longer duration, and this may then be analyzed to determine the character of the frequency modulation, and the shape of the input pulse desired. As a filter network is a linear element it is reversible and the pulse obtained at the output is exactly the shape (but reversed in time sequence) of the pulse that should be generated and applied to the filter network in order to compress said pulse and obtain the desired one of short duration and high amplitude.

The invention may be more fully understood by reference to Fig. 2 which shows in block diagram form a radio object-locating system of the desired character and which is adapted to compress pulses of electrical energy. A transmitter 2 which may comprise a magnetron or other suitable high frequency generator, provides as an output therefrom, relatively long duration, high carrier frequency exploratory pulses of radiant energy. These pulses do not have a fixed carrier frequency but rather are frequency modulated by means of frequency modulator 4. The type of frequency modulation is generally the same as that described in conjunction with Fig. 1 and specifically is of the form as determined by analysis of a low pass filter such as heretofore described. The exploratory pulses are carried by a suitable transmission line 6 which may consist of a wave guide, through transmit-receive switch 8 to directional antenna 10 which radiates the exploratory pulses in a directional beam.

Transmit-receive switch 8 connects transmitter 2 to directional antenna 10 while exploratory pulses are being transmitted and disconnects receiver 12. During the interim between transmitted pulses and while echo pulses are being received, transmit-receive switch 8 connects directional antenna 10 to receiver 12 and disconnects the receiver from transmitter 2.

The returning echo pulses which are likewise of relatively long duration are then applied through transmit-receive switch 8 and connection 13 to mixer 14, a second input to said mixer comprising continuous wave oscillations from local oscillator 16. The beat frequency output of mixer 14 consists of frequency modulated echo pulses where the overall frequency band is reduced to an intermediate frequency band (i. e., considering the description of Fig. 1, the carrier frequency of each incremental pulse is reduced to an intermediate frequency).

If desired, the output of mixer 14 may be amplified by intermediate frequency amplifier 18, the output of which is then applied to the pulse compression filter 20. The pulse compression filter may consist of a low pass filter, the action of which was heretofore described, whose output is thus a pulse having a width much narrower and an amplitude much greater than the frequency modulated pulse applied as an input to said filter.

The output of pulse compression filter 20 is then applied to a detector 22 which transforms the pulse output of filter 20 into video pulses which are then applied to a video amplifier 24 and thence to an indicator 26. Indicator 26 may comprise a cathode ray tube which thus indicates objects detected by the radio object-locating system.

Although the actual transmitted pulses radiated from directional antenna 10 are relatively long in duration, good resolution is obtained. The reason for this is as follows and may be more readily understood from Fig. 3. In the figure assume that points 30 and 31 are two objects a predetermined distance apart. Then pulse 32 may represent an echo pulse returned by object 30 and pulse 33 may represent an echo pulse returned by object 31. It is apparent that the two are superimposed in part and if they were applied to the usual type of radio object-locating system, only one signal would appear on the cathode ray tube for both objects. In the present system, however, pulse 32 is compressed by pulse compression filter 20 and achieves the general idealized shape as shown in pulse 34. In a similar manner pulse 33 is compressed and attains the general idealized shape as shown in pulse 35. It is thus seen that both points 30 and 31 are represented by individual pulses 34 and 35. The echo pulses returned from points 30 and 31 retain their individuality throughout the circuit as the circuit remains linear through pulse compression filter 20.

Referring again to Fig. 1b, the general form of frequency modulation there shown indicates that the frequency is a maximum at the beginning of the pulse and a minimum at the end of the pulse. This is not necessary; and, in fact, may be reversed so as to take the general form as shown in Fig. 1c wherein the frequency at the beginning of the pulse is lower than the frequency at the end of the pulse. It is true that the general shape of the pulse entering the low pass compression filter 20 must be that of Fig. 1b. However, if a pulse having a frequency modulation characteristic as shown in Fig. 1c is transmitted and a similar pulse received, the general shape of the frequency characteristic may be reversed so as to be like that shown in Fig. 1b merely by making the frequency of the local oscillator 16 greater than the highest frequency contained in the frequency modulated pulse.

It is deemed preferable in the present embodiment to achieve the pulse compression at an intermediate frequency stage. However, it is to be pointed out that it is possible to achieve the pulse compression at the radio frequency and in order to accomplish this, a high pass filter such as a section of wave guide may be used. In a high pass wave guide filter, the group velocity of the signal of electrical energy increases as the frequency of the energy increases. Thus, a frequency modulated pulse having a spectrum of the general character shown in Fig. 1c is required.

Again the action of the wave guide or high pass filter may be understood by considering the actual pulse to consist of a number of contiguous incremental pulses as shown in Fig. 1a. In the present instance, however, the carrier frequency of the second incremental pulse $f_2$ is greater than the carrier frequency of the first incremental pulse $f_1$, and similarly the carrier frequency $f_3$ of the third incremental pulse is greater than the carrier frequency $f_2$ of the second incremental pulse, etc. The first incremental pulse enters the high pass filter first and moves at a certain group velocity. The second incremental pulse next enters the high pass filter (or wave guide) but its velocity is slightly greater than the group velocity of the first incremental pulse. Similarly, subsequent incremental pulses have still greater group velocities and the effect of the contiguous incremental pulses as they travel through the high pass filter or wave guide overtake one another is to finally bunch together at the end of the filter to thus produce a signal pulse having a width narrower and an amplitude greater than the original frequency modulated pulse applied thereto.

Attention is once again directed to the fact that the concept of considering each frequency modulated pulse as a number of incremental pulses is by way of example only and thus the representations as shown in Fig. 1 are an idealized form only and are not to be taken as representing the actual shape of the pulses to be generated. The actual shape of the pulse to be transmitted and the character of frequency modulation may be readily determined by manner heretofore disclosed. If desired, pulse compressor filter 20 in Fig. 2 may be a high pass filter and in such an instance, the frequency modulation characteristic of the pulse applied to the filter should be of the same general character as that shown in Fig. 1c.

The system shown in Fig. 2 may be adapted to provide pulse compression in the radio frequency stage. In doing this, pulse compressor filter 20 is removed and I. F. amplifier 18 is directly connected to detector 22. Connection 13 between transmit-receive switch 8 and mixer 14 may consist of a high pass filter such as a section of wave guide. The action of the high pass wave guide filter is then as described above, and long duration low amplitude pulses received at directional antenna 10 are converted into short duration high amplitude pulses and applied to mixer 14.

Having thus described the present invention what is claimed as new and desired to be secured by Letters Patent is:

1. A radio object-locating system including means for generating and transmitting pulses on a frequency modulated carrier wave of radiant energy, said pulses having a predeterminable duration, amplitude, and energy, means for receiving corresponding object returned echo pulses, a mixer, and means for applying said echo pulses thereto, a local oscillator, and means for applying the output thereof to said mixer to obtain therefrom, frequency modulated echo pulses having an intermediate frequency characteristic, a pulse compressor filter, means for applying said intermediate frequency modulated pulses thereto whereby pulses having a duration less than and an amplitude greater than said received echo pulses of predeterminable duration are obtained as an output from said compressor filter, an indicator, and means for applying the output of said compressor filter thereto.

2. A radio object locating system including means for transmitting pulses of radiant carrier wave energy, the carrier wave of each of said pulses being frequency modulated, means for receiving only corresponding object returned echo pulses, and filter means coupled to said receiving means and adapted to delay the first received carrier frequency components in each of said pulses by a greater amount than the later received carrier frequency components, said filter means also combining said delayed components, whereby said echo pulses are decreased in duration and increased in amplitude.

3. A pulse compressor for transforming pulses on a frequency modulated carrier wave of radiant energy, said pulses having a predeterminable duration, amplitude, and energy, into pulses having a duration less than said predeterminable duration and greater than said predeterminable amplitude, wherein the frequency modulation characteristic is such that the carrier frequency of the pulses in general increases with time, including a high pass filter section, means for applying said first mentioned frequency modulated pulses thereto to obtain as an output from said filter section, pulses having a duration less than, and an amplitude greater than, said pulses of predeterminable duration, amplitude, and energy.

4. A pulse compressor for transforming pulses on a frequency modulated carrier wave of radiant energy, said pulses having a predeterminable duration, amplitude, and energy, into pulses having a duration less than said predeterminable duration and greater than said predeterminable amplitude, wherein the frequency modulation characteristic is such that the carrier frequency of the pulses in general decreases with time, including a low pass filter section, means for applying said first mentioned frequency modulated pulses thereto to obtain as an output from said filter section, pulses having a duration less than, and an amplitude greater than, said pulses of predeterminable duration, amplitude, and energy.

5. In combination, a source of pulses of frequency modulated carrier wave energy of given duration and amplitude, means excited by said energy and adapted to delay the carrier frequency components first applied thereto for a longer period than the carrier frequency components later applied thereto, and means for combining said delayed components to derive pulses of shorter duration than said first-mentioned pulses.

6. A radio object-locating system comprising means for generating and transmitting pulses on a frequency modulated carrier wave of radiant energy, means for receiving only corresponding object-returned echo pulses, and a delay device coupled to said receiving means to delay the first received frequencies in each of said echo pulses by a greater amount than the later received frequencies so as to compress each of said pulses whereby pulses of a duration less than and an amplitude greater than that of said received echo pulses of predeterminable duration are obtained.

7. A radio object-locating system comprising means for generating and transmitting pulses on a frequency-modulated carrier wave of radiant energy, the frequency of said carrier wave increasing with time during the period of each pulse, means for receiving only corresponding object-returned echo pulses, and a delay device coupled to said receiving means to delay lower frequencies more than higher frequencies for obtaining pulses of a duration less than and an amplitude greater than that of said received echo pulses of predeterminable duration.

8. A radio object-locating system comprising means for generating and transmitting pulses on a frequency-modulated carrier wave of radiant energy, the frequency of said carrier wave decreasing with time during the period of each pulse, means for receiving only corresponding object-returned echo pulses, and a delay device coupled to said receiving means to delay higher frequencies more than lower frequencies for providing pulses of a duration less than and an amplitude greater than that of said received echo pulses of predeterminable duration.

9. A radio object-locating system comprising means for generating and transmitting pulses on a frequency-modulated carrier wave of radiant energy, said pulses having a predeterminable duration and amplitude, the frequency of said carrier wave increasing with time, means for receiving only corresponding object-returned echo pulses, a mixer coupled to said receiving means, a local oscillator of a frequency greater than those frequencies of said carrier wave coupled to said mixer, and a delay device coupled to said mixer to delay higher frequencies more than lower frequencies to compress said pulses whereby pulses of a duration less than and an amplitude greater than that of said received echo pulses of predeterminable duration are obtained.

10. A method of object detection comprising the steps of transmitting pulses of radiant energy of a predetermined duration, varying the carrier frequency of said pulses in a predetermined manner, receiving only echo pulses of said duration, the carrier frequency of which varies in the same manner as the transmitted pulses, and delaying the first received carrier frequencies in said echo pulses by a greater amount than the later received echo carrier frequencies, whereby shorter duration, higher amplitude pulses are derived.

ROBERT H. DICKE.

REFERENCES CITED

The following references are of record in the file of this patent:

UNITED STATES PATENTS

| Number | Name | Date |
|---|---|---|
| 2,407,644 | Benioff | Sept. 17, 1946 |
| 2,408,742 | Eaton | Oct. 8, 1946 |
| 2,423,644 | Evans | July 8, 1947 |
| 2,433,804 | Wolff | Dec. 30, 1947 |
| 2,490,808 | Hoffman | Dec. 13, 1949 |
| 2,522,367 | Guanella | Sept. 12, 1950 |